(12) United States Patent
Tiirola et al.

(10) Patent No.: US 8,849,292 B2
(45) Date of Patent: Sep. 30, 2014

(54) SOUNDING REFERENCE SIGNAL CONFIGURATION

(75) Inventors: Esa Tapani Tiirola, Kempele (FI); Kari Juhani Hooli, Oulu (FI); Kari Pekka Pajukoski, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 271 days.

(21) Appl. No.: 13/504,994

(22) PCT Filed: Nov. 2, 2009

(86) PCT No.: PCT/EP2009/064434
§ 371 (c)(1),
(2), (4) Date: Jun. 8, 2012

(87) PCT Pub. No.: WO2011/050856
PCT Pub. Date: May 5, 2011

(65) Prior Publication Data
US 2012/0252474 A1 Oct. 4, 2012

(51) Int. Cl.
*H04W 72/00* (2009.01)
*H04L 5/00* (2006.01)

(52) U.S. Cl.
CPC .......... *H04L 5/0048* (2013.01); *H04L 5/0091* (2013.01); *H04L 5/0053* (2013.01)
USPC .......................................... 455/450; 370/329

(58) Field of Classification Search
CPC ... H04L 5/0048; H04L 5/0053; H04L 5/0091; H04L 5/0007; H04L 25/0228; H04W 88/08; Y02B 60/31
USPC ................................................ 455/450, 513
See application file for complete search history.

(56) References Cited

U.S. PATENT DOCUMENTS

| | | | |
|---|---|---|---|
| 2008/0298524 A1 | 12/2008 | Koorapaty et al. | 375/348 |
| 2009/0109908 A1* | 4/2009 | Bertrand et al. | 370/329 |
| 2010/0226327 A1* | 9/2010 | Zhang et al. | 370/329 |
| 2010/0322115 A1* | 12/2010 | Wei et al. | 370/280 |

FOREIGN PATENT DOCUMENTS

| | | |
|---|---|---|
| JP | 2008546226 A | 12/2008 |
| KR | 20080005609 A | 1/2008 |
| WO | WO 2006/124042 A1 | 11/2006 |
| WO | WO 2008069117 A1 | 6/2008 |

OTHER PUBLICATIONS

3GPP TS 36.212 V8.3.0; "3rd Generation Partnership Project; Technical Specification Group Radio Access Network; Evolved Universal Terrestrial Radio Access (E-UTRA); Multiplexing and channel coding (Release 8)"; May 2008; Chapter 5.3.3.1.7 on p. 45.

(Continued)

*Primary Examiner* — Kashif Siddiqui
(74) *Attorney, Agent, or Firm* — Harrington & Smith (57) ABSTRACT

The present invention is related to configuration of uplink sounding reference signal transmissions in a modern cellular telecommunication system. A terminal device of a cellular telecommunication system is configured to apply a sounding reference signal configuration used for transmitting a dynamically scheduled sounding reference signal from the terminal device to a base station. In connection with the scheduling of the transmission of the sounding reference signal, the present invention utilizes a downlink control message transmitted to the terminal device regardless of whether or not uplink data transmission is scheduled to the terminal device at the same time.

29 Claims, 3 Drawing Sheets

(56) References Cited

OTHER PUBLICATIONS

Huawei; "TPC for PUSCH and PUCCH on format 3/3A"; TSG-RAN WG 1 #54, Jeju, South Korea, Aug. 18-22, 2008; R1-083043; whole document (3 pages); 3rd Generation Partnership Project (3GPP); Mobile Competence Centre; 650, Route des Lucioles; F-06921 Sophia-Antipolis Cedex; France; URL: http://www.3gpp.org/ftp/tsg_ran/WG1_RL1/TSGR1_54/Docs/R1-083043.zip.

Nokia Siemens Networks, et al.; "Channel sounding enhancements for LTE-Advanced"; 3GPP TSG RAN WG1 Meeting #59, Jeju, Korea, Nov. 9-13, 2009; R1-094653; whole document (3 pages); 3rd Generation Partnership Project (3GPP); Mobile Competence Centre; 650, Route des Lucioles; F-06921 Sophia-Antipolis Cedex; France; URL: http://www.3gpp.org/ftp/tsg_ran/WG1_RL/TSGR1_59/Docs/R1-094653.zip.

Tdoc R1-02-1296, TSG-RAN Working Group 1 #29, Shanghai, China, Nov. 5-8, 2002, "Fast CQI Requesting". Siemens, 5 pgs.

R1-081366, 3GPP TSG RAN WG1 #52bis, Shenzhen, China, Mar. 31-Apr. 4, 2008, "Views on SRS Parameters", Texas Instruments, 4 pgs.

R1-090872, 3GPP TSG-RAN WG1 #56, Feb. 9-13, 2009, Athens, Greece, "SU-MIMO operation for UL of LTE-A", Qualcomm Europe, 3 pgs.

R1-092677, 3GPP TSG RAN WG1 #57bis, Los Angeles, USA, Jun. 29-Jul. 3, 2009, "STS Transmission Issues in LTE-A", Samsung, 3 pgs.

\* cited by examiner

SOUNDING REFERENCE SIGNAL CONFIGURATION

FIELD

The invention relates to the field of cellular radio telecommunications and, particularly, to configuring transmission of an uplink sounding reference signal in a modern cellular telecommunication system.

BACKGROUND

Universal Mobile Telecommunication System (UMTS) Long-term Evolution (LTE) utilizes uplink sounding reference signals (SRS) for many control purposes, e.g. frequency domain packet scheduling, transmission timing control and transmit power control, adaptive modulation and coding, multi-user MIMO (multiple-input-multiple-output) communication pairing. There are many new use cases for SRS in LTE-Advanced, e.g., support for component carrier aggregation, multi-cluster (frequency domain clustering) scheduling within one component carrier, as a support in determining an uplink pre-coding matrix indicator (PMI) and a rank indicator for multi-antenna transmission, as a support in downlink channel state estimation when channel reciprocity is exploited, and as a support in selecting collaborative pre-coding and/or beam selection in uplink coordinated multi-point transmission/reception (CoMP). In connection with upcoming evolution versions of the UMTS accurate results in SRS analysis are required for sensitive CoMP communication or pre-coding information, for example, and therefore more reliability is required in transmission of the SRS.

BRIEF DESCRIPTION

According to an aspect of the present invention, there is provided a method as specified in claim 1.

According to another aspect of the present invention, there is provided an apparatus as specified in claim 13.

According to another aspect of the present invention, there is provided an apparatus as specified in claim 27.

According to another aspect of the present invention, there is provided an apparatus as specified in claim 28.

According to yet another aspect of the present invention, there is provided a computer program product embodied on a computer readable distribution medium as specified in claim 29.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
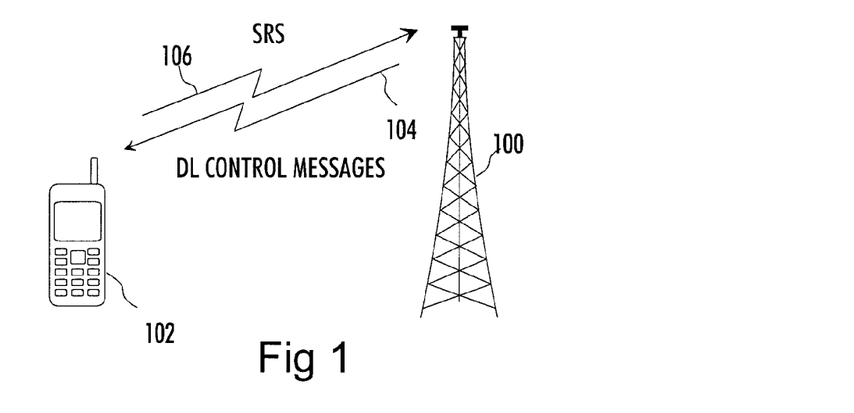
FIG. 1 illustrates communication between a mobile terminal and a base station of a cellular telecommunication system.

FIG. 1 illustrates a communication scenario to which embodiments of the invention may be applied. A terminal device 102 is in communication with a base station 100 of a cellular telecommunication system. The cellular telecommunication system may be a Long-term Evolution (LTE) or LTE-Advanced of the UMTS (Universal Mobile Telecommunication System). However, it should be noted that the present invention is not limited to the UMTS and it may be applied to other telecommunication systems utilizing uplink sounding reference signals. As illustrated in FIG. 1, the base station 100 controls a communication link established between the terminal device 102 and the base station by transmitting downlink control messages to the terminal device 102 by using downlink control channels 104. In order to enable efficient communication control, the terminal device 102 transmits sounding reference signals (SRSs) 106 to the base station 100, SRS transmissions may occur in connection with or without allocation of a resource on a physical uplink shared channel (PUSCH) as in the LTE. The SRS is typically transmitted on a frequency band wider than that used for data transmission, and the SRS may be transmitted when the terminal device has no transmissions on the PUSCH. Furthermore, the SRS is transmitted on a bandwidth larger than a coherence bandwidth of a radio channel and within a time period shorter than a coherence time of the radio channel. The base station 100 then analyses the received SRS and uses the SRS for numerous communication control procedures, as listed in the Background section.

According to an embodiment of the invention, the terminal device 102 is configured with at least two different SRS configurations, and both SRS configurations are in parallel use. One of the SRS configurations may be associated with conventional periodic SRS transmissions, while the other SRS configuration is associated with dynamically scheduled SRS transmissions. It should be noted that terminal device may also be configured with a single SRS configuration associated either with conventional periodic SRS transmissions or dynamically scheduled SRS transmissions. However, description of a single type of SRS configuration is now omitted, because it is simply a generalization of this description.

Figure 2:
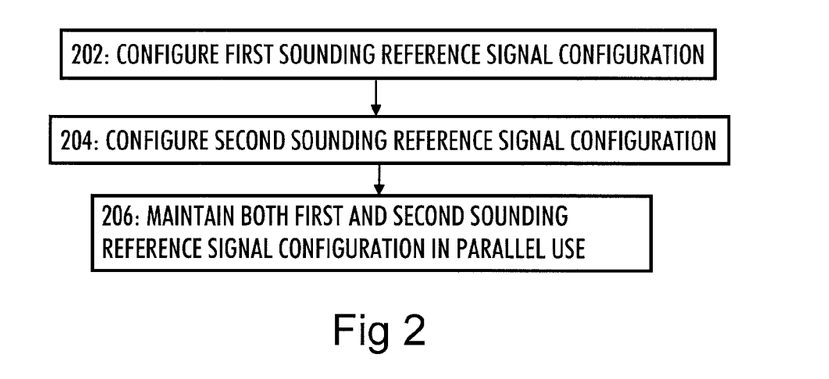
FIG. 2 is a flow diagram illustrating a sounding reference signal configuration process according to an embodiment of the invention.

FIG. 2 illustrates a generic concept of allocating a plurality of different SRS configurations. In block 202, a first SRS configuration is configured to be used by the terminal device. Block 202 may be executed in both the base station and the terminal device so that both of them are aware of parameters of the SRS configuration. Block 202 may also include at least radio resource control (RRC) communication between the terminal device and the base station, wherein the parameters of the SRS configuration are communicated from a RRC circuitry of the base station to the terminal device. The first SRS configuration utilizes periodic transmission of the SRS by using the communication resources and parameters defined by the first SRS configuration.

In block 204, a second SRS configuration is configured to be used by the terminal device. Block 204 may be executed in both the base station and the terminal device so that both of them are aware of parameters of the second SRS configuration. Block 204 may also include RRC communication between the terminal device and the base station, wherein the parameters of the second SRS configuration are communicated from the RRC circuitry of the base station to the terminal device. Dynamically scheduled transmissions of the SRS utilize communication resources and parameters defined by the second SRS configuration. Further SRS configurations (periodic and/or dynamic) may be configured in a similar manner according to block 202 or 204.

Figure 8:
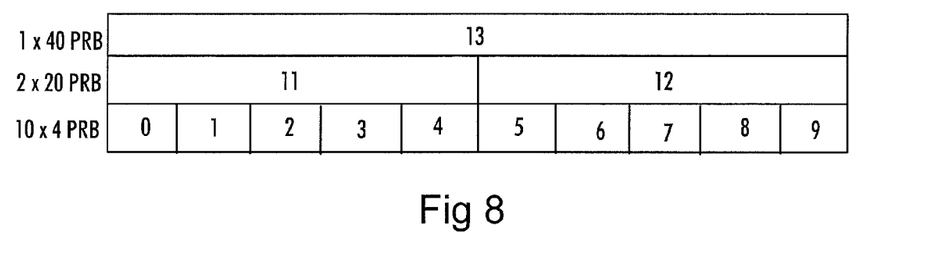
FIG. 8 illustrates tree-type bandwidth resource allocation related to sounding reference signal configurations.

In block 206, the SRS configurations configured in blocks 202 and 204 (and further SRS configurations) are used in parallel so as to provide reliability and flexibility to the utilization of the SRSs. All SRS configurations may be in parallel use until they are deactivated via RRC signaling. The SRS configuration and their parameters and resources as such may be carried out by using the higher layer RRC signaling which, in practice, means that the RRC parameters are semi-static parameters. The semi-statically configured communication parameters of a given SRS configuration may include at least one of the following: a bandwidth communication resource defining a bandwidth of the SRS, a cyclic shift resource defining a cyclic shift of a signal sequence of the SRS (LTE allows for 8 cyclic shifts of the SRS sequence to enable code division multiplexing), a spectral shape resource defining the spectral shape of the sounding reference signal (the shape of a comb-shaped spectrum of the SRS, LTE supports currently two different shapes for each SRS bandwidth), a periodicity parameter defining the periodicity of the sounding reference signal, and a sub-frame offset parameter defining a transmission timing of the sounding reference signal as an offset from a reference sub-frame (variable from zero up to 319 sub-frames, where the available maximum sub-frame offset corresponds to the period as defined by the periodicity parameter). With respect to the bandwidth communication resource, the bandwidth resource may be configured to be continuous in time for every SRS transmission time interval in the PUSCH, or it may be configured as periodic with a periodicity defined by the periodicity parameter. In the UMTS LTE, the base station may allocate: 13 different SRS frequency domain physical resource block (PRB) resources with different bandwidths for 10 MHz system bandwidth: 1) one SRS resource of 40 physical (frequency) resource blocks, PRB; 2) two SRS resources of 20 PRBs; and/or 3) ten SRS resources of 4 PRBs. The SRS bandwidth resource allocation follows a tree-type topology with several resource allocation options. One embodiment for the tree-type topology is illustrated in FIG. 8, where one (or more) of the SRS bandwidth resources denoted by the numerals 0 to 13 are allocated to a given terminal device. The SRS bandwidth communication resource may or may not utilize frequency hopping. When configured, the frequency hopping follows a predetermined pattern. The SRS resource of fewer PRBs (narrower bandwidth) provides more versatility to the frequency hopping. In theory, a maximum SRS capacity is 160 SRS configurations per sub-frame in 10 MHz bandwidth: 10 4-PRB resources*2 combs*8 parallel cyclic shifts. In practice, only part of the available cyclic shifts are currently used so as not to increase interference caused by the parallel use of the same SRS sequence with different cyclic shifts. A plurality of separated low-bandwidth SRS resources, e.g. four PRBs, may be allocated to the terminal device rather than a single high-bandwidth SRS resource, e.g. 20 or 40 PRBs. In other words, one or more SRS resources allocated to other terminal devices may be located between the SRS resources allocated to the terminal device. This enables multi-cluster SRS allocation, pseudo high-bandwidth SRS configuration, and efficient SRS resource utilization, because a plurality of pseudo high-bandwidth SRS configurations may be arranged.

With respect to the second SRS configuration, the periodicity parameter and/or the sub-frame offset may be used to enable efficient multiplexing of dynamic and periodic SRS resources. The periodicity parameter and the sub-frame offset effectively determine the allowed transmission timings of the SRS and, when the second SRS configuration is scheduled, the terminal device may send the SRS of the second SRS configuration in the next transmission time instant allowed by the pre-configured periodicity parameter and/or the sub-frame offset. The transmission timing may be defined in the second (dynamic) SRS configuration, for example, according to one of the following principles: the second SRS configuration defines as a timing parameter only sub-frame offset, i.e. the SRS transmission is always available when SRS is utilized in the cell; or the second SRS configuration defines as the timing parameter both the periodicity parameter and the sub-frame offset, i.e. the SRS transmission is available only periodically where the period is defined by the periodicity parameter.

In an embodiment, the utilization of the dynamically scheduled SRS configuration is restricted to those SRS sub-frames that are defined on a broadcast channel broadcasted by the base station to contain the SRS. An advantage is that the current broadcast signaling indicating the SRS sub-frames needs no modification to support the dynamically scheduled SRS configurations.

In an embodiment, currently unused indices of UE-specific SRS periodicity $T_{SRS}$ and sub-frame offset configuration $T_{offset}$ index table, as defined in the 3GPP specifications for the UMTS LTE, are used to signal the dynamically scheduled SRS configurations, e.g. the second SRS configuration, to the terminal device. Currently unused SRS configuration indices of an SRS configuration index $I_{SRS}$ may be used to signal the sub-frame offset and/or periodicity for the dynamically scheduled SRS configurations. Currently unused indices of the $I_{SRS}$ may also be used to indicate that the signaled SRS configuration relates to the dynamically configured SRS configuration.

The flow diagram of FIG. 2 is described above on a general level, and the steps of FIG. 2 include functionalities in both the base station and the terminal device. The process of FIG. 2 may be defined by a computer program product embodied on a computer-readable distribution medium and comprising software modules for carrying out each step of FIG. 2 when executed by a computer or a processor.

Conventionally, the SRS transmission itself is also inherently semi-static which means that its reconfiguration is slow due to the fact that the reconfiguration is carried out on higher layers (RRC). According to an embodiment of the present invention, at least part of the SRS configurations are used for transmitting dynamically scheduled sounding reference signals. Let us consider a scenario where a first SRS configuration utilizes a conventional semi-static periodic SRS transmission with predetermined semi-static parameters as defined through the RRC signaling. Additionally, a second SRS configuration is configured to the terminal device. The parameters of the second SRS configuration may be configured in a manner similar to the configuration of the first SRS configuration, i.e. the parameters of the second SRS configuration may be semi-static parameters changed through the higher layer signaling. Contrary to the periodic transmission of the first SRS configuration, the transmission of the SRSs of the second SRS configuration is scheduled by the base station in a dynamic manner when additional SRS transmissions are needed. The scheduling is carried out on a lower layer, e.g. medium access control (MAC) layer and/or on a physical layer, so as to enable fast scheduling and fast response when higher channel sounding reliability is needed. Additionally, fast scheduling of the dynamic SRS transmissions enables efficient utilization of limited SRS resources even when the SRS utilization is close to the capacity limit. The signaling diagram of FIG. 3 illustrates this embodiment in greater detail.

Figure 3:
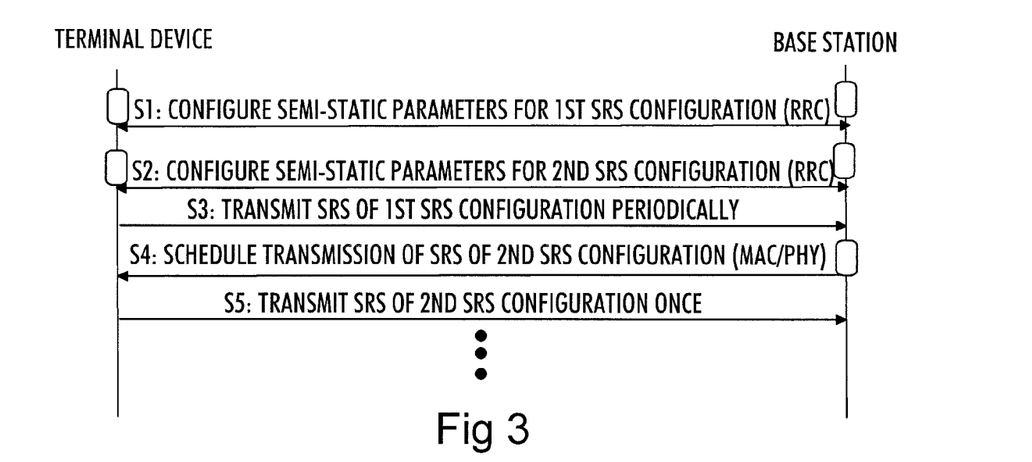
FIG. 3 is a signaling diagram illustrating a sounding reference signal configuration and scheduling process according to an embodiment of the invention.

Referring to FIG. 3, an RRC circuitry comprised in the base station (or another network element of a radio access network) determines semi-static parameters for a first SRS configuration of the terminal device in S1. The semi-static parameters may include one or more of the parameters listed above. Furthermore, the RRC circuitry communicates the semi-static parameters of the SRS configuration to the terminal device through RRC signaling via a radio interface between the base station and the terminal device. Upon reception of the parameters of the first SRS configuration, a communication control circuitry of the terminal device configures the terminal device to apply the parameters of the first SRS configuration. The SRS configuration in step S1 may be carried out according to Release 8 of the UMTS LTE specifications. In S2, the RRC circuitry determines semi-static parameters for a second SRS configuration of the terminal device. The semi-static parameters may include one or more of the parameters listed above. Furthermore, the RRC circuitry communicates the semi-static parameters of the second SRS configuration to the terminal device through RRC signaling via the radio interface between the base station and the terminal device. Upon reception of the parameters of the second SRS configuration, the communication control circuitry of the terminal device configures the terminal device to apply the parameters of the second SRS configuration. The SRS configuration in step S2 may also be carried out according to Release 8 of the UMTS LTE specifications. However, one difference between the first and second SRS configuration from the point of view of the network is that the first SRS configuration is unique for each terminal device in a cell so that the SRS transmissions of multiple terminal devices do not collide, while the second SRS configuration may be allocated to a plurality of terminal devices, and the scheduler handles the scheduling of the SRS transmissions of the second SRS configuration such that no collisions occur. In practice, terminal devices assigned with the same SRS configuration will not be scheduled to transmit simultaneously SRS transmissions of the same SRS configuration.

In S3, the terminal device transmits SRS transmissions of the first SRS configurations periodically by using communication resources and other transmission parameters defined by the first SRS configuration. The periodic transmissions are continued until RRC level reconfiguration or unless otherwise specified.

In S4, the communication control circuitry of the base station (or another network element) determines that further SRS transmissions are needed to improve the reliability of the SRS analysis and, as a consequence, the scheduler comprised in the base station (or another network element) schedules SRS transmission of the second SRS configuration. S4 comprises determining appropriate transmission timing for the communication resources and parameters of the second SRS configuration, scheduling an uplink transmission resource (transmission timing) to the second SRS configuration of the terminal device, and transmitting to the terminal device a downlink control message indicating that the SRS transmission of the second SRS configuration is to be carried out. The terminal device receives the downlink control message, processes it and configures its transmitter to transmit the SRS of the second SRS configuration to the base station in S5. The communication control circuitry then receives the additionally scheduled SRS transmission and processes to improve the SRS analysis, e.g. to improve configuration of uplink single-user MIMO or coordinated multi-point transmission/reception (CoMP).

The procedure of FIG. 3 proceeds in a similar manner, i.e. the SRS transmissions of the first SRS configuration are transmitted periodically and, when additional SRS transmissions are needed, the scheduler schedules additional SRS transmissions of the second SRS configuration dynamically. The additional SRS transmissions may be scheduled particularly to terminal devices conducting frequent uplink data transmission, because such terminal devices typically need reliable channel state information acquired from the SRSs. With respect to the embodiment of FIG. 3, it can be envisaged that the first SRS configuration is also a dynamically scheduled SRS configuration, in which case the scheduler may schedule all the SRS transmissions of the terminal device. SRS transmissions of both SRS configurations may be triggered with the same downlink control channel scheduling message even by using a single bit. Alternatively, the two dynamic SRS configurations may be scheduled separately by using separate scheduling bits for the two SRS configurations.

Naturally, the order of the steps S1 and S2 in FIG. 3 is optional, and either SRS configuration may be configured before the other, or they may be configured simultaneously. Similarly, steps S4 and S5 may precede step S3.

Above, it was mentioned that only a single SRS configuration may be configured for the terminal device. The single SRS configuration may be a hybrid SRS configuration combining the periodic and dynamic SRS configuration. In practice, the parameters and resources of the hybrid SRS configuration may be configured in a similar manner than any one of the dynamic and periodic SRS configuration. The SRS transmissions of the hybrid SRS configuration may be carried out periodically as in the first SRS configuration described above, and when further SRS transmissions are required, additional SRS transmissions may be scheduled dynamically. Both dynamic and periodic SRS transmissions of the hybrid SRS configuration may utilize the same transmission parameters and resources as defined by the hybrid SRS configuration. An advantage in this embodiment is that only a single SRS configuration needs to be configured instead of two which releases SRS resources to be used for other terminal devices.

The dynamically scheduled SRS transmissions of the second SRS configuration may be "one-shot transmissions" which, in practice, means that when the SRS transmission of the second SRS configuration is scheduled, the terminal device carries out the SRS transmission only once and further SRS transmission occurs only after another scheduling command is received from the base station. The one-shot transmission or scheduling is also tolerant to errors when compared with a scheme where the SRS transmission is activated and deactivated by using separate control messages, or when compared with a scheme where the configuration of the SRS transmission parameters and resources is configured on a lower layer, e.g. MAC layer and/or physical layer. A lower level SRS configuration does not utilize acknowledgment messages (ACK/NACK) to confirm correct reception of the SRS configurations, while RRC level SRS configuration does so. When using the separate activation and deactivation messages, if the terminal device misses deactivation of the SRS configuration, it may continue the transmission of the SRS for a long period, thereby interfering with another terminal device just being assigned with the same SRS configuration. With respect to the one-shot scheduling, if the terminal device fails to receive an SRS scheduling grant message, it only misses that transmission without causing interference.

The SRS transmission may comprise transmission of a single SRS, or it may comprise transmitting an SRS sequence. The second SRS configuration may include a plurality of sub-configurations, one for each antenna of the terminal device. Each sub-configuration may comprise at least partly different communication resources or other parameters that enables distinction of the SRS transmission from other SRS transmissions. When the SRS transmission of the second SRS is scheduled, the terminal device may be configured to carry out the SRS transmissions of all the sub-configurations of the second SRS configuration in consecutive SRS sub-frames (or in the same sub-frame from different antennas, for example) in a predetermined order known also to the scheduler and the base station so that the scheduler is able to schedule transmission timing suitable for transmission of the SRS sequence without collisions. Instead of considering the different dynamically scheduled SRS configurations as sub-configurations, they may be considered as independent dynamically scheduled SRS configurations, and the scheduler may still trigger the sequential one-shot transmission of all dynamically scheduled SRSs in one scheduling command.

There may arise situations where the scheduler schedules the SRS transmission of the second SRS configuration such that the transmission of the SRS of the second SRS configuration collides with the transmission of the SRS of the first SRS configuration, specifically at the same antenna port. A collision occurs when UE is configured to transmit both periodic and dynamically scheduled SRS transmission in the same SRS symbol and from the same antenna port. In such a case, the transmission of the dynamically scheduled SRS may be prioritized over the transmission of the periodic SRS. In practice, the transmission of the periodic SRS is canceled and the transmission of the dynamically scheduled SRS is carried out. The terminal device may comprise a collision detection unit configured to detect the collisions of the SRSs of different SRS configurations of the terminal device. Similarly, the base station may comprise a similar unit so that the base station is able to detect that the dynamically scheduled SRS with its parameters is being received at the base station instead of the periodic SRS. However, the scheduler of the base station is aware of the collision beforehand and makes a conscious decision to schedule the dynamic SRS transmission so that it collides with the periodic SRS transmission.

Figure 4:
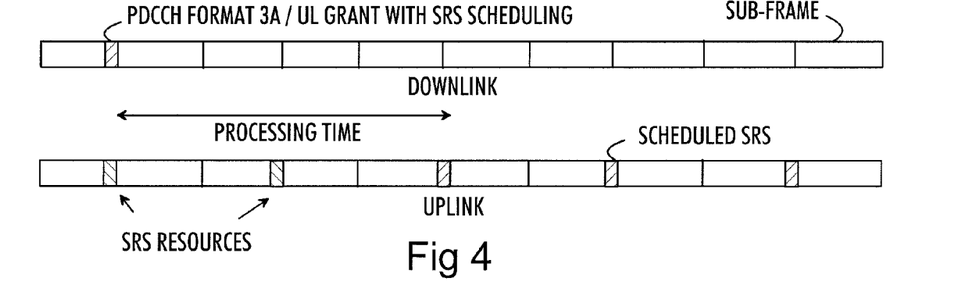
FIG. 4 illustrates scheduling of sounding reference signals according to an embodiment of the invention.

FIG. 4 illustrates dynamic scheduling of the second SRS configuration. FIG. 4 illustrates both downlink and uplink sub-frames and control resources in the sub-frames. The scheduler dynamically schedules the terminal device to transmit the SRS of the second SRS configuration in an uplink SRS denoted by "scheduled SRS" in FIG. 4 and controls a transmitter of the base station to create a physical downlink control channel control (PDCCH) message comprising an information element indicating the scheduling to the terminal device. The scheduler takes into account the processing time of the transmitter, the travel time over a radio channel between the base station and the terminal device, and the processing time required by the terminal device to process the received PDCCH message and to prepare for the uplink SRS transmission. Upon reception of the PDCCH message indicating the scheduling, the terminal device processes the PDCCH message and controls its transmitter to transmit the SRS of the second SRS configuration in the next available SRS resource determined by the sub-frame offset and/or periodicity parameter of the second SRS configuration.

The information element indicating the scheduling may be included in an uplink grant message indicating uplink scheduling of a data packet as well. However, the uplink grant message is not necessarily transmitted frequently. Furthermore, channel knowledge is typically needed prior to scheduling UL data. Therefore, the information about the scheduling of the SRS transmission may be contained in a PDCCH Format 3A type of a message of the UMTS LTE (Advanced) used for conveying transmit power control commands and transmitted to the terminal device frequently. As a consequence, the downlink control message containing the scheduling information is transmitted to the terminal device regardless (or independently) of whether or not uplink data transmission is scheduled to the terminal device at the same time. An advantage is that the additional SRS transmission may be scheduled more frequently, which enables more efficient utilization of the SRS resources. In both embodiments of the control messages, the control message may comprise a one-bit information element indicating to the terminal device whether or not the (one-shot) transmission of the SRS of the second SRS configuration is scheduled to the terminal device. The shared control message naturally contains such one-bit information elements for a plurality of terminal devices, and each terminal device is configured to read the correct one-bit element from a specific (pre-configured) location of the control message. With respect to the scheduling of step S4 in FIG. 3, the base station may schedule multiple terminal devices at the same time by using the shared control message although the description of FIG. 3 only discusses a single terminal device.

Figure 5A:
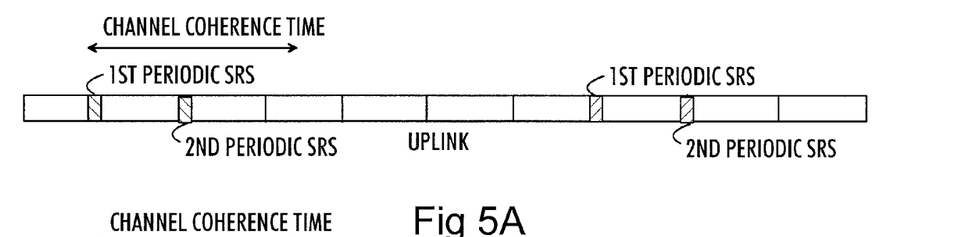
FIGS. 5A to 5C illustrate embodiments for bundling sounding reference signal transmissions.
Figure 5B:
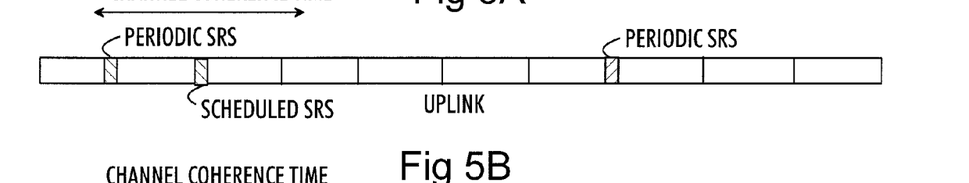
Figure 5C:
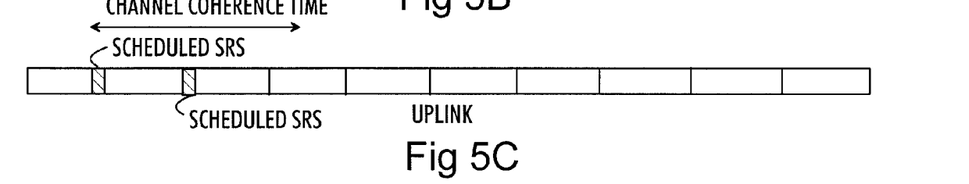

FIGS. 5A to 5C illustrate transmission of a plurality of SRSs from the terminal device to the base station within a time period shorter than assumed coherence time of the radio channel. This improves the performance of the SRS analysis because the SRS transmissions may be combined to improve the reliability of the SRS. Carrying out such combinations may be referred to as "SRS bundling". In the example of FIG. 5A, the terminal device is configured with two periodic SRS configurations. The periodicity parameter of the two SRS configurations may be the same and the sub-frame offset may differ by one or more sub-frames but the difference in the sub-frame offset is preferably lower than the channel coherence time. As a consequence, the SRS transmissions of the two SRS configurations occur periodically in consecutive sub-frames, when sub-frame offset difference is one sub-frame, or in sub-frames separated by time duration lower than the channel coherence time. In the SRS analysis in the base station, the SRS transmissions of the two SRS configurations that are within the channel coherence time are aggregated so as to provide the SRS analysis with more information about the channel condition. In this scenario, dynamically scheduled SRS transmissions are not considered.

In the example of FIG. 5B, the terminal device is configured with a periodic SRS configuration and a dynamically scheduled SRS configuration. The periodicity parameter may be utilized in the configuration of both SRS configurations so that the periodicity parameter of the two SRS configurations is the same. Additionally, the sub-frame offset may differ by one or more sub-frames but the difference in the sub-frame offset is preferably lower than the channel coherence time. As a consequence, the SRS resources of the two SRS configurations occur periodically in consecutive sub-frames when the sub-frame offset difference is one sub-frame, or in sub-frames separated by time duration shorter than the channel coherence time. As a consequence, the scheduler may schedule the SRS transmission of the dynamically scheduled SRS configuration and the SRS transmission occurs such that the SRS transmissions of both SRS configurations occur within the channel coherence time. Accordingly, the two SRS transmissions that are within the channel coherence time are aggregated so as to provide the SRS analysis with more information about the channel condition.

In the example of FIG. 5C, the terminal device is configured with two (or more) dynamically scheduled SRS configurations. The periodicity parameters and/or sub-frame offsets of the SRS configurations may be arranged such that the SRS transmissions of the two SRS configurations always use SRS resources that are within the channel coherence time, or the SRS configurations may be arranged such that the SRS transmissions of the two SRS configurations utilize arbitrary periodicity parameters and/or sub-frame offsets. In the latter embodiment, the scheduler, being aware of the possible transmission timings of the two SRS configurations and the channel coherence time, may select the transmission timings of the two SRS configurations such that the SRS transmissions occur within the channel coherence time. Then, the SRS transmissions may be aggregated to improve the SRS analysis. One of the SRS configurations may be configured with the sub-frame offset as the only timing parameter which provides flexibility to the scheduling in the sense that such SRS transmission is always available and the scheduler does not have to wait for a suitable time instant when the transmission timings of the two SRS configurations match. The other SRS configuration may define either a periodic timing resource or only the sub-frame offset, and in the latter case SRS transmissions of both SRS configurations are always available for scheduling. In both cases, both SRS configurations may be scheduled by using a shared scheduling grant message (or even shared command (one bit) in the scheduling message). Another option is to trigger the SRS transmissions in separate scheduling grant control messages.

The examples of FIGS. 5A to 5C are related to single-antenna uplink SRS sounding, but they naturally apply to single-user MIMO sounding as well. Then, the plurality of antennas in the terminal device may have separate SRS configurations, and the embodiments of FIGS. 5A to 5C may be carried out by applying a plurality of parallel processes of FIGS. 5A to 5C. Assigning a plurality of SRS transmissions within the channel coherence time improves the coverage of the SRS transmissions. Particularly, a reliable SRS analysis may be ensured for terminal devices located at the edge of the cell because of additional SRS transmissions.

Figure 6:
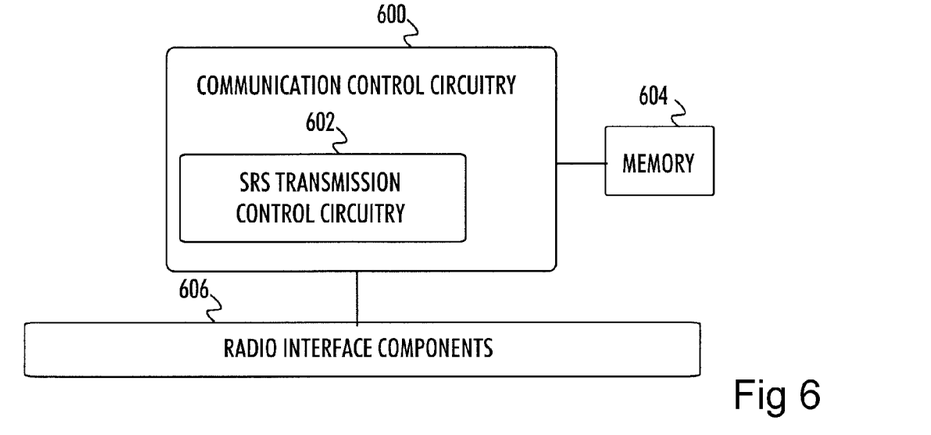
FIG. 6 illustrate a block diagram of an apparatus according to an embodiment of the invention.

FIG. 6 illustrates an exemplary structure of an apparatus according to an embodiment of the invention. The apparatus may be applied to the terminal device described above. The apparatus comprises radio interface components 606 enabling establishment of a radio connection with a base station of a cellular telecommunication system. The radio interface components 606 may be configured to process transmitted and received signals according to the specifications of the UMTS LTE and/or another telecommunication system the terminal device supports. The apparatus further comprises a memory unit 604 storing communication parameters and other parameters needed in the radio communications. The memory unit 604 may also store one or more computer programs configuring the apparatus to carry out embodiments of the invention.

The apparatus further comprises a communication control circuitry 600 implementing the embodiments of the invention (driven by one or more computer programs in some embodiments) in the terminal device. The communication control circuitry 600 controls the communication operations carried out in the terminal device. The communication control circuitry 600 may comprise an SRS transmission control circuitry 602 as a sub-circuitry. The SRS transmission control circuitry 602 receives SRS configurations through the radio interface components 606 from the base station and stores the SRS configurations in the memory unit 604. Then, the SRS transmission control circuitry 602 causes the terminal device to transmit SRSs of periodic SRS configurations periodically by using the SRS resources and other parameters as specified in the SRS configuration stored in the memory unit 604. The communication control circuitry 600 may continuously monitor PDCCH control messages in order to detect a dynamically scheduled SRS transmission. If the communication control circuitry detects the dynamically scheduled SRS transmission in a PDCCH control message, it instructs the SRS transmission control circuitry 602 to carry out the SRS transmission in the next available SRS resource of the dynamically scheduled SRS configuration. The SRS transmission control circuitry 602 then checks the memory unit 604 for the next available transmission time instant specified in the dynamically scheduled SRS configuration and controls the radio interface components 606 to transmit the SRS according to the dynamically scheduled SRS configuration in the next possible SRS resource.

Figure 7:
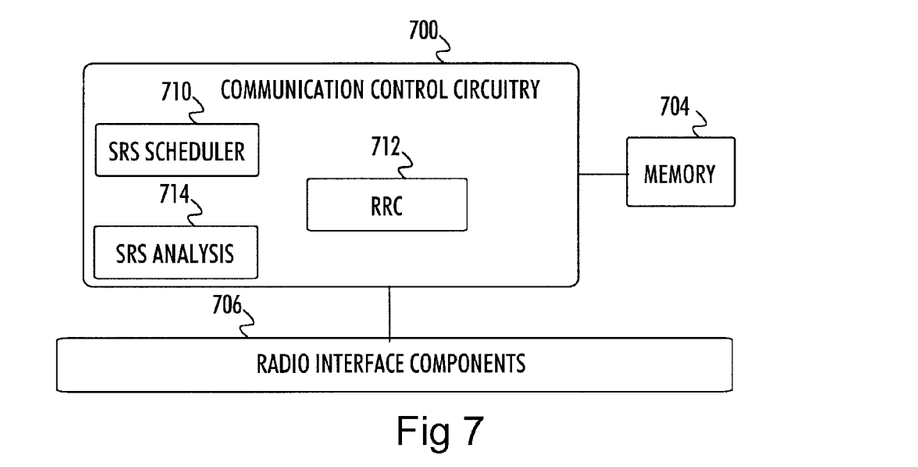
FIG. 7 illustrates a block diagram of another apparatus according to an embodiment of the invention.

FIG. 7 illustrates an exemplary structure of another apparatus according to an embodiment of the invention. The apparatus may be applied to the base station described above. The apparatus comprises radio interface components 706 enabling establishment of radio connection with terminal devices. The radio interface components 706 may be configured to process transmitted and received signals according to the specifications of the UMTS LTE and/or another telecommunication system. The apparatus further comprises a memory unit 704 storing communication parameters and other parameters needed in the radio communications. The memory unit 604 may also store one or more computer programs configuring the apparatus to carry out embodiments of the invention.

The apparatus further comprises a communication control circuitry 700 implementing the embodiments of the invention (driven by one or more computer programs in some embodiments) in the base station. The communication control circuitry 700 controls the communication operations carried out in the base station. The communication control circuitry 700 may comprise an SRS scheduler circuitry 710, an SRS analysis circuitry 714, and an RRC circuitry 712 as sub-circuitries. The RRC circuitry 712 may handle RRC level configuration and reconfiguration of SRS configurations semi-statically. Accordingly, the RRC circuitry 712 may allocate periodic SRS configurations and dynamic SRS configuration to the terminal devices controlled by the base station. The RRC circuitry 712 may assign one periodic SRS configuration per terminal device but the same dynamic SRS configuration may be assigned to a plurality of terminal devices. The RRC circuitry may store the allocated SRS configurations in association with identifiers of the terminal devices to which each SRS configuration is allocated so that the RRC circuitry 712, the SRS scheduler 710, and the SRS analysis circuitry 714 are aware of which SRS configuration is assigned to which terminal device.

The SRS analysis analyses the SRS transmissions received from the terminal devices through the radio interface components. The SRS analysis circuitry determines the uplink (and possible reciprocal downlink) channel state between a given terminal device and the base station. The SRS analysis circuitry may detect a degraded quality in the SRS transmissions of a given terminal device and, as a result, it may instruct the SRS scheduler to schedule additional SRS transmissions to the terminal device so as to improve the quality of the SRS analysis. Another event causing the scheduling of additional SRS transmissions is in connection with reception of an uplink scheduling request requesting transmission of uplink data from the terminal device. Before determining the uplink resources to be used for the data transmission, the communication control circuitry 700 may control the scheduler to schedule additional SRS transmission(s) to improve the SRS analysis and, as a consequence, the performance of the resource allocation for the uplink data transmission is improved. Upon reception of the additional SRS transmissions, the SRS analysis circuitry may aggregate a plurality of SRS transmissions received from the terminal device within the channel coherence time, as described above. The SRS scheduler circuitry 710 schedules the transmissions of dynamic SRS configurations as requested by the SRS analysis circuitry (or other parts of the communication control circuitry 700).

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or another network device.

The processes or methods described in connection with FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The cellular telecommunication system may have a fixed infrastructure providing wireless services to terminal devices. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
configuring a terminal device of a cellular telecommunication system to apply
a sounding reference signal configuration used for transmitting a dynamically scheduled sounding reference signal from the terminal device to a base station, and
a second sounding reference signal configuration used for transmitting a second sounding reference signal periodically in a semi-static manner from the terminal device to the base station,
wherein the both sounding reference signal configurations are in parallel use; and
utilizing, in connection with the scheduling of the transmission of the sounding reference signal, a downlink control message transmitted to the terminal device regardless of whether or not uplink data transmission is scheduled to the terminal device at the same time.

2. The method of claim 1, further comprising: triggering one-shot transmission of the sounding reference signal associated with semi-static communication resources of the sounding reference signal configuration.

3. The method of claim 1, wherein communication parameters of the sounding reference signal configuration are configured in a semi-static manner.

4. The method of claim 3, wherein the semi-statically configured communication parameters include at least one of the following: a bandwidth communication resource, a cyclic shift resource defining a cyclic shift of a signal sequence of the sounding reference signal, a spectral shape resource defining the spectral shape of the sounding reference signal, a periodicity parameter defining the periodicity of the sounding reference signal, and a sub-frame offset parameter defining a transmission timing of the sounding reference signal.

5. The method of claim 1, further comprising: prioritizing transmission of the dynamically scheduled sounding reference signal over the transmission of the periodic sounding reference signal if the dynamically scheduled sounding reference signal is scheduled such that it collides with transmission of the periodic sounding reference signal.

6. The method of claim 1, wherein the downlink control message is a physical downlink control channel Format 3A message according to the specification of Universal Mobile Telecommunication System, Long-Term Evolution comprising information elements used for scheduling the second sounding reference signal.

7. The method of claim 1, wherein the downlink control message comprises a one-bit information element indicating to the terminal device whether or not the transmission of the second sounding reference signal is scheduled to the terminal device.

8. The method of claim 1, further comprising:
configuring the terminal device to apply a plurality of different dynamically scheduled sounding reference signal configurations used for transmitting dynamically scheduled sounding reference signals; and
triggering sequential one-shot transmission of all dynamically scheduled sounding reference signals with one scheduling command.

9. The method of claim 1, further comprising:
allocating the same dynamically scheduled sounding reference signal configuration to a plurality of terminal devices; and
scheduling only one of the plurality of terminal devices to utilize the sounding reference signal configuration at a time.

10. The method of claim 1, further comprising:
configuring the terminal device to apply a second sounding reference signal configuration used for transmitting a second sounding reference signal periodically in a semi-static manner from the terminal device to the base station;
communicating the periodic second sounding reference signal in a first transmission time instant;
scheduling the transmission of the dynamically scheduled sounding reference signal to a second transmission time instant, wherein the time duration between the first transmission time instant and second transmission time instant is shorter than the assumed coherence time of a radio channel between the terminal device and the base station; and
aggregating the dynamically scheduled sounding reference signal and the second sounding reference signal to improve reliability of sounding reference signal analysis.

11. The method of claim 1, further comprising:
scheduling the transmission of two dynamically scheduled sounding reference signals to two transmission time instants, wherein the time duration between the two transmission time instants is shorter than the assumed coherence time of a radio channel between the terminal device and the base station; and
aggregating the two dynamically scheduled sounding reference signals to improve reliability of sounding reference signal analysis.

12. The method of claim 1, further comprising:
configuring the terminal device to apply two sounding reference signal configurations used for transmitting periodic sounding reference signals periodically in a semi-static manner from the terminal device to the base station;
allocating periodic transmission timings of said two sounding reference signal configurations such that the time duration between transmission time instants of said two sounding reference signal configurations is shorter than the assumed coherence time of a radio channel between the terminal device and the base station; and
aggregating the sounding reference signals received in consecutive transmission time instants associated with the two sounding reference signal configurations to improve reliability of sounding reference signal analysis.

13. An apparatus comprising:
a communication control circuitry configured
to configure a terminal device of a cellular telecommunication system to apply
a sounding reference signal configuration used for transmitting a dynamically scheduled sounding reference signal from the terminal device to a base station, and
a second sounding reference signal configuration used for transmitting a second sounding reference signal periodically in a semi-static manner from the terminal device to the base station,
wherein the both sounding reference signal configurations are in parallel use; and
to utilize, in connection with the scheduling of the transmission of the sounding reference signal, a downlink control message transmitted to the terminal device regardless of whether or not uplink data transmission is scheduled to the terminal device at the same time.

14. The apparatus of claim 13, wherein the communication control circuitry is further configured to trigger one-shot transmission of the sounding reference signal associated with semi-static communication resources of the sounding reference signal configuration.

15. The apparatus of claim 13, wherein communication parameters of the sounding reference signal configuration are configured in a semi-static manner.

16. The apparatus of claim 15, wherein the semi-statically configured communication parameters include at least one of the following: a bandwidth communication resource, a cyclic shift resource defining a cyclic shift of a signal sequence of the sounding reference signal, a spectral shape resource defining the spectral shape of the sounding reference signal, a periodicity parameter defining the periodicity of the sounding reference signal, and a sub-frame offset parameter defining a transmission timing of the sounding reference signal.

17. The apparatus of claim 13, wherein the communication control circuitry is configured to prioritize transmission of the dynamically scheduled sounding reference signal over the transmission of the periodic sounding reference signal if the dynamically scheduled sounding reference signal is scheduled such that it collides with transmission of the periodic sounding reference signal.

18. The apparatus of claim 13, wherein the downlink control message is a physical downlink control channel Format 3A message according to the specification of Universal Mobile Telecommunication System, Long-Term Evolution comprising information elements used for scheduling the second sounding reference signal.

19. The apparatus of claim 13, wherein the downlink control message comprises a one-bit information element indicating to the terminal device whether or not the transmission of the second sounding reference signal is scheduled to the terminal device.

20. The apparatus of claim 13, wherein the communication control circuitry is further configured to configure the terminal device to apply a plurality of different dynamically scheduled sounding reference signal configurations used for transmitting dynamically scheduled sounding reference signals, and to trigger sequential one-shot transmission of all dynamically scheduled sounding reference signals with one scheduling command.

21. The apparatus of claim 13, wherein the apparatus is applicable to the base station and wherein the communication control circuitry is further configured to allocate the same dynamically scheduled sounding reference signal configuration to a plurality of terminal devices and to schedule only one of the plurality of terminal devices to utilize the sounding reference signal configuration at a time.

22. The apparatus of claim 13, wherein the apparatus is applicable to the base station and wherein the communication control circuitry is further configured to configure the terminal device to apply a second sounding reference signal configuration used for transmitting a second sounding reference signal periodically in a semi-static manner from the terminal device to the base station, to communicate the periodic second sounding reference signal in a first transmission time instant, to schedule the transmission of the dynamically scheduled sounding reference signal to a second transmission time instant, wherein the time duration between the first transmission time instant and second transmission time instant is shorter than the assumed coherence time of a radio channel between the terminal device and the base station, and to aggregate the dynamically scheduled sounding reference signal and the periodic second sounding reference signal to improve reliability of sounding reference signal analysis.

23. The apparatus of claim 13, wherein apparatus is applicable to the base station and wherein the communication control circuitry is further configured to schedule the transmission of two dynamically scheduled sounding reference signals to two transmission time instants, wherein the time duration between the two transmission time instants is shorter than the assumed coherence time of a radio channel between the terminal device and the base station, and to aggregate the dynamically scheduled sounding reference signals to improve reliability of sounding reference signal analysis.

24. The apparatus of claim 13, wherein the apparatus is applicable to the base station, wherein the communication control circuitry is further configured to configure the terminal device to apply two sounding reference signal configurations used for transmitting periodic sounding reference signals periodically in a semi-static manner from the terminal device to the base station, and wherein the communication control circuitry is further configured to allocate periodic transmission timings of said two sounding reference signal configurations such that the time duration between the transmission time instants of said two sounding reference signal configurations is shorter than the assumed coherence time of a radio channel between the terminal device and the base station, and to aggregate the sounding reference signals received in consecutive transmission time instants associated with the two sounding reference signal configurations to improve reliability of sounding reference signal analysis.

25. The apparatus of claim 13, wherein the apparatus is the base station of the cellular telecommunication system.

26. The apparatus of claim 13, wherein the apparatus is the terminal device of the cellular telecommunication system.

27. An apparatus, comprising:
at least one processor; and
at least one memory including a computer program code, wherein the at least one memory and the computer program code are configured to, with the at least one processor, cause the apparatus to:
configure a terminal device of a cellular telecommunication system to apply
a sounding reference signal configuration used for transmitting a dynamically scheduled sounding reference signal from the terminal device to a base station, and
a second sounding reference signal configuration used for transmitting a second sounding reference signal periodically in a semi-static manner from the terminal device to the base station,
wherein the both sounding reference signal configurations are in parallel use; and
utilize, in connection with the scheduling of the transmission of the sounding reference signal, a downlink control message transmitted to the terminal device regardless of whether or not uplink data transmission is scheduled to the terminal device at the same time.

28. An apparatus, comprising:
means for configuring a terminal device of a cellular telecommunication system to apply
a sounding reference signal configuration used for transmitting a dynamically scheduled sounding reference signal from the terminal device to a base station, and
a second sounding reference signal configuration used for transmitting a second sounding reference signal periodically in a semi-static manner from the terminal device to the base station,
wherein the both sounding reference signal configurations are in parallel use; and
means for utilizing, in connection with the scheduling of the transmission of the sounding reference signal, a downlink control message transmitted to the terminal device regardless of whether or not uplink data transmission is scheduled to the terminal device at the same time.

29. A computer program product embodied on a non-transitory medium readable by a computer and comprising program instructions which, when loaded into an apparatus, execute the method according to claim 1.

* * * * *